Patented Feb. 6, 1951

2,540,787

UNITED STATES PATENT OFFICE 2,540,787

PRODUCTION OF BENZONITRILE

Frank A. Klimitas, Pitman, and Herbert E. Rasmussen, Woodbury, N. J., assignors to Socony-Vacuum Oil Company, Incorporated, a corporation of New York No Drawing. Application December 1, 1948, Serial No. 62,974

5 Claims. (Cl. 260—465)

This invention relates, broadly, to an improved process for producing benzonitrile and is more particularly concerned with an improved catalytic process for the production of benzonitrile from toluene and ammonia.

In accordance with the process disclosed and claimed in U. S. Patent No. 2,450,632, benzonitrile is produced by reacting toluene with ammonia, in the gaseous phase, and at elevated temperatures and in the presence of a catalytic material containing molybdenum oxide. It is to be noted that the process described in the aforementioned patent is not limited to any particular type of reaction zone. The process may be readily carried out in an adiabatic reactor or in an isothermal reactor.

As is well known to those versed in the art, an isothermal process is one in which the reaction temperature is maintained substantially constant throughout the duration of the reaction. This is accomplished by regulating the heat input and output to the reactors. On the other hand, in an adiabatic process, heat input and output are not regulated, other than by the sensible heat introduced in the preheated charge. As a result, the temperature within the reaction zone fluctuates.

It has now been discovered that, when operating in an adiabatic reactor, it is possible to obtain increased yields of benzonitrile. It has also been discovered that the unexpectedly improved yields referred to are not realized when the process is operated in an isothermal reactor.

It has been found that, when operating the aforementioned process in an adiabatic reactor, the injection of water into the charge stream of reactants results in unexpectedly improved conversions per pass and improved ultimate yields of benzonitrile.

Accordingly, it is an object of the present invention to provide an improvement in the commercial process for the production of benzonitrile. An important object is to provide an improvement in the catalytic, adiabatic process for the production of benzonitrile which is inexpensive and commercially feasible. A specific object is to provide improved conversions per pass and improved ultimate yields in the catalytic, adiabatic processes for producing benzonitrile, which comprises reacting toluene with ammonia, at elevated temperatures, and in the presence of a catalyst including a molybdenum oxide. Other objects and advantages of the present invention will become apparent to those skilled in the art from the following description.

Broadly stated, the present invention provides an improved process for the production of benzonitrile, which comprises contacting toluene with ammonia, in the gaseous phase, in an adiabatic reaction zone, at temperatures varying between about 800° F. and the decomposition temperature of ammonia, in the presence of a catalyst including a molybdenum oxide, and in the presence of water in amounts upwards of about one per cent by weight, based on the weight of toluene.

The ratio of ammonia to the toluene reactant may vary over a wide range with little effect on the ultimate yield. In general, the reaction mixture may contain as little as 2 mole per cent or as much as 98 mole per cent of toluene reactant. Ordinarily, however, it is preferred to use charges containing between about 20 mole per cent and about 90 mole per cent of toluene. In practice, it is preferable, usually, to use charges containing a molar excess of ammonia over the toluene.

In accordance with the present invention, water may be charged into the adiabatic reaction zone directly, or it may be charged in admixture with one of the reactants. In practice, it is preferred to charge the water in admixture with one of the reactants. Water in amounts as small as 0.5 per cent based on the weight of the toluene produces the satisfactory results contemplated herein. Ordinarily, however, water in amounts varying between about one per cent and about ten per cent based on the weight of the toluene produces the most satisfactory results. It is to be understood, however, that water may be used in amounts greater than about ten per cent of the weight of the toluene, it being within the skill of one versed in the art to determine the optimum amount of water to be used in any specific operation.

The catalysts operative to produce benzonitrile by reacting toluene with ammonia, in the improved adiabatic process of the present invention, are those containing a molybdenum oxide, such as molybdenum sesquioxide ($Mo_2O_3$), molybdenum dioxide ($MoO_2$), molybdenum trioxide ($MoO_3$), and molybdenum pentoxide ($M_2O_5$). In the interest of brevity, it must be clearly understood that when reference is made to molybdenum oxide herein and in the claims, the various oxides of molybdenum will be contemplated. While all of these molybdenum oxides are operative in the present process, they are not equivalent in their effectiveness from the standpoint of catalytic activity, molybdenum trioxide ($MoO_3$), being the preferred catalytic material.

While these molybdenum oxides exhibit different degrees of effectiveness when used per se, they generally possess additional catalytic activity when used in conjunction with the well known supports, such as alumina, silica gel, Carborundum, pumice, clays, and the like. It is especially preferred to use alumina as a support, and a catalyst comprising molybdenum oxide supported on an activated alumina or an alumina gel is particularly useful in the process of the present invention.

The concentration of molybdenum oxide in the supported catalysts influences the conversion per pass. In general, the conversion per pass increases with increase in the concentration of molybdenum oxide. For example, a catalyst comprising 30 parts by weight of molybdenum trioxide on 70 parts by weight of activated alumina is more effective than one comprising 10 parts by weight of molybdenum trioxide on 90 parts by weight of activated alumina. It is to be understood, however, that supported catalysts containing larger or smaller amounts of the molybdenum oxides may be used in the process of the present invention.

In order to obtain initial maximum catalytic efficiency, particularly where the catalytic material comprises the higher molybdenum oxides, the catalysts should be conditioned prior to use in the process. Conditioned catalysts are those which have been exposed to ammonia or hydrogen, or both, for a period of time, several minutes to several hours, depending upon the quantity, at temperatures varying between about 800° F. and about 1300° F. If desired, however, the conditioning treatment may be dispensed with, inasmuch as the catalyst becomes conditioned during the initial stages of the present process, when the catalyst comes in contact with the ammonia reactant.

In operation, the catalysts become fouled with carbonaceous material which ultimately affects their catalytic activity. Accordingly, when the efficiency of the catalyst declines to a point where further operation becomes uneconomical or disadvantageous from a practical standpoint, the catalyst may be regenerated, as is well known in the art, by subjecting the same to a careful oxidation treatment, for example, by passing a stream of air or air diluted with flue gases or steam over the same, under appropriate temperature conditions and for a suitable period of time, such as the same period of time as the duration of the catalytic operation. Preferably, the oxidation treatment is followed by a purging treatment, such as passing over the catalyst a stream of purge gas, for example, steam, nitrogen, carbon dioxide, hydrocarbon gases, etc.

The reaction or contact time, i. e., the period of time during which a unit volume of the reactants is in contact with the catalyst, may vary between a fraction of a second and several minutes. Thus, the contact time may be as low as 0.01 second and as high as 20 minutes. It is preferred to use contact times varying between 0.1 second and one minute, particularly, between 0.3 second and 30 seconds. It must be realized that at best these figures are estimates based on a number of assumptions. For all practical purposes, as in catalytic processes of the type of the present invention, the more reliable data on contact time is best expressed, where feasible and as is well known in the art, in terms of liquid space velocities, in the present instance, the volume of toluene reactant per volume of catalyst per hour. Accordingly, it has been found that the space velocities may be varied considerably and that velocities varying between about one-fourth and about four are quite satisfactory for the purposes of the present invention.

In general, the temperatures to be used in the process of the present invention vary between about 800° F. and the decomposition temperature of ammonia (about 1250–1300° F.), and, preferably, between about 850° F. and about 1075° F. The preferred temperature to be used in any particular adiabatic operation will depend upon the type of catalyst employed. Generally speaking, the higher temperatures increase the conversion per pass, but they also decrease the ultimate yields of benzonitrile by increasing the decomposition of the reactants. Accordingly, the criteria for determining the optimum temperature to be used in any particular adiabatic operation will be based on the type of catalyst and a consideration of commercial feasibility from the standpoint of striking a practical balance between conversion per pass and losses to decomposition.

The process of the present invention may be carried out at subatmospheric, atmospheric or superatmospheric pressures. Superatmospheric pressures are advantageous in that unreacted charge materials condense more readily. Subatmospheric pressures appear to favor the reactions involved, since the reaction products have a larger volume than the reactants, and hence, it is evident from the Le Chatelier-Braun principle that the equilibrium favors nitrile formation more at reduced pressures. However, such pressures reduce the throughput of the reactants and present increased difficulties in recycling unreacted charge materials. Therefore, atmospheric or superatmospheric pressures are preferred.

The present process may be carried out by making use of any of the well-known techniques for operating catalytic reactions in the vapor phase effectively. By way of illustration, a water-toluene mixture and ammonia may be vaporized separately in separate preheating zones. The vaporized reactants are then introduced in suitable proportions into an adiabatic reaction zone containing a catalyst of the type defined hereinbefore. The adiabatic reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in an adiabatic reaction chamber, the catalyst will be thereafter suitably separated from the reaction mixture by disengaging baffles, etc. The reaction mixture will be, predominantly, a mixture of benzonitrile, hydrogen, unchanged toluene, unchanged ammonia, and water. The benzonitrile, unchanged toluene, and water will be condensed in passing through the condensing zone and will be retained in the receiving chamber. Benzonitrile can be separated from the water and the unchanged toluene by any of the numerous and well-known separation procedures, such as fractional distillation. Similarly, the uncondensed hydrogen and unchanged ammonia can be separated from each other by absorbing the ammonia in a suitable medium and subsequently recovering it. The water and unchanged toluene and ammonia can be recycled to the process, with or without the addition of fresh water, toluene and ammonia.

It will be apparent that the process may be operated as a batch or discontinuous process as by using a catalyst-bed-type adiabatic reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when one or more catalyst chambers are used through which the catalyst flows in contact with the reactants. In such a continuous process, the catalyst will flow through the reaction zone in contact with the reactants and will thereafter be separated from the reaction mixture in a disengaging zone, before condensing the reaction mixture. In a continuous process, therefore, the catalyst—fresh or regenerated—and the reactants—fresh or recycled—will flow continuously through a reaction chamber.

The following specific examples are for the purpose of illustrating the mode of preparing benzonitrile in accordance with the process of the present invention, and for the purpose of demonstrating the advantages thereof. These examples also illustrate the singular applicability of the process to adiabatic reaction zones. It is to be clearly understood that the invention is not to be limited to the specific catalyst disclosed hereinafter, or to the conditions and manipulations set forth in the examples.

EXAMPLES I TO XIV

The reaction system included a pair of adiabatic reactors containing 100 parts by weight of catalyst comprising 10 parts by weight of molybdenum trioxide supported on 90 parts by weight of a synthetic alumina gel; preheating zones; a condensing zone; a receiving chamber; and gas separators and scrubbers. In each of the runs, toluene and ammonia were preheated separately in the preheating zones. The reactants were continuously charged in the vapor phase into one of the reactors in an ammonia-toluene mole ratio varying between about one and about 1.3, respectively, at such a rate that the liquid space velocity was about 2.5. During this operation, water, when used, was introduced into the toluene stream, passing into the preheater. The reaction mixture passed from the reactor, through the condensing zone, into a receiving chamber. The unchanged ammonia, light gases, and hydrogen were sent to the gas separators and scrubbers where they were continuously scrubbed with water. The hydrogen and the light gases were metered and vented. The ammonia was discarded as ammonium hydroxide. The benzonitrile and unchanged toluene were separated by distillation; the benzonitrile was drawn off and the toluene was recycled to the toluene preheater. At the end of about six hours, i. e., one cycle, the charge streams from the preheaters were switched to the other reactor and the process was continued; the catalyst in the first reactor was subjected to regeneration during its off-cycle.

The pertinent data and the results of each run are tabulated in Tables I and II.

TABLE I
*Runs made in adiabatic reactor—anhydrous conditions*

| Example | Average Catalyst Bed Temp., °F. | Ammonia Toluene Mole Ratio | Liquid Space Velocity | Yield Per Pass [1] | Ultimate Yield [1] |
|---|---|---|---|---|---|
| I | 961 | 1.05 | 2.66 | 2.80 | 54.0 |
| II | 962 | 1.03 | 2.60 | 3.12 | 53.3 |
| III | 974 | 1.09 | 2.15 | 3.31 | 54.7 |
| IV | 980 | 1.03 | 2.48 | 3.11 | 51.0 |
| V | 936 | 1.24 | 2.15 | 3.40 | 51.6 |

[1] Lbs. benzonitrile per 100 lbs. toluene charged.

TABLE II
*Runs made in adiabatic reactor—water-in-charge*

| Example | Per Cent Water Charged [1] | Avg. Catalyst Bed Temperature, °F. | Ammonia Toluene Mole Ratio | Liquid Space Velocity | Yield Per Pass [2] | Ultimate Yield [2] |
|---|---|---|---|---|---|---|
| VI | 0.50 | 965 | 1.09 | 2.49 | 3.53 | 50.0 |
| VII | 0.92 | 992 | 1.12 | 2.48 | 4.57 | 68.0 |
| VIII | 0.95 | 961 | 1.08 | 2.48 | 4.39 | 66.8 |
| IX | 1.00 | 971 | 1.04 | 2.48 | 4.87 | 70.0 |
| X | 1.46 | 971 | 1.09 | 2.49 | 4.29 | 73.9 |
| XI | 2.02 | 980 | 1.13 | 2.48 | 4.32 | 62.8 |
| XII | 3.12 | 983 | 1.06 | 2.48 | 4.73 | 68.6 |
| XIII | 5.96 | 1005 | 1.06 | 2.50 | 4.42 | 67.7 |
| XIV | 9.82 | 1000 | 1.08 | 2.11 | 4.31 | 61.2 |

[1] Based on toluene, by weight.
[2] Lbs. benzonitrile per 100 lbs. toluene charged.

A comparison of the data in Tables I and II shows that the conversions per pass to benzonitrile increase up to 56.6 per cent (from 3.11 to 4.87) and the ultimate yields increase up to 45 per cent (from 51.0 to 73.9), when water is introduced into the charge. On the average, the conversion per pass is increased about 40 per cent and the ultimate yield is increased about 25 per cent, by the process of the present invention. The data in Table II indicate that a slight improvement in conversion per pass is evident when 0.5 per cent of water is added to the toluene charge. When, however, the amount of water is increased to one per cent, appreciable increases in conversion per pass and in ultimate yields are obtained. Within limits, this increase remains constant when water is added in amounts of up to 10 per cent. It is evident, therefore, that improved yields are obtained when water is added in any reasonable amount, and the optimum improvement is obtained upon addition of from about one per cent to about 10 per cent of water.

It is to be noted that the run of Example IV, Table I, made under anhydrous conditions, was made between the water-in-charge runs of Examples XII and XIV, Table II. The data on these runs clearly show that the catalyst stability is not affected by the use of water.

EXAMPLES XV AND XVI

The runs, the pertinent data of which are set forth in Table III, were made under similar conditions except for the absence of water in the run of Example XV. The apparatus and procedure were the same as used to obtain the data set forth in Tables I and II, except that only one adiabatic reactor was used throughout each run, with no regeneration of catalyst at the end of each six-hour period. Samples were taken hourly from the product stream to provide the data shown in Tables III and IV.

TABLE III

| Run Conditions | Example XV | Example XVI |
|---|---|---|
| Length of on-stream period, hrs | 24 | 24 |
| Length of reaction cycle, hrs | 24 | 24 |
| Avg. catalyst bed temp., °F | 988 | 1,000 |
| Ammonia:toluene mole ratio | 1.00 | 1.10 |
| Liquid space velocity | 2.61 | 2.61 |
| Water, per cent of toluene by weight | None | 1.05 |

TABLE IV

*Yields per pass*

| On-Stream Period, Hrs. | Conversion/Pass ($\frac{\text{lbs. benzonitrile}}{100 \text{ lbs. toluene charged}}$) | |
|---|---|---|
| | Example XV | Example XVI |
| 1 | 2.2 | 3.0 |
| 2 | 2.7 | 4.4 |
| 3 | 3.6 | 5.1 |
| 4 | 3.2 | 5.1 |
| 5 | 3.6 | 5.1 |
| 6 | 2.8 | 5.2 |
| 7 | 2.6 | 4.5 |
| 8 | 2.4 | 2.8 |
| 9 | 2.4 | 4.0 |
| 10 | 2.0 | 3.5 |
| 11 | 2.0 | 3.0 |
| 12 | 1.7 | 2.7 |
| 13 | 2.1 | 3.0 |
| 14 | 1.8 | 2.6 |
| 15 | 1.4 | 2.2 |
| 16 | 1.4 | 1.9 |
| 17 | 1.5 | 1.9 |
| 18 | 1.4 | 1.7 |
| 19 | 1.4 | 1.4 |
| 20 | 1.6 | 1.5 |
| 21 | 1.3 | 1.1 |
| 22 | 1.3 | 1.1 |
| 23 | 1.3 | 0.9 |
| 24 | 1.0 | 1.5 |

From the data, it is evident that the improvement in conversion per pass in the water-in-charge run is pronounced during the first fifteen hours of the operation. After this period of time, the coke accumulation on the catalyst makes differences negligible. It is obvious, therefore, that the conversions per pass and the ultimate yields are greatly improved during the entire course of the process of the present invention, when operating under the conditions whereby a freshly regenerated catalyst is used every six hours during the run.

The following examples set forth comparative runs made in an isothermal reactor. Some of the runs were made under the conditions of the process set forth in the patent referred to hereinbefore; and the other runs were made in a similar manner using the water-in-charge improvement of the present invention.

EXAMPLES XVII TO XX

A reactor consisting of a shell containing a catalyst chamber heated by circulating a heat-transfer medium thereover, and containing 100 parts by weight of catalyst comprising 10 parts by weight of molybdenum trioxide supported on 90 parts by weight of a synthetic alumina gel was used in each of the runs. Ammonia and toluene were introduced in the vapor phase into the isothermal reactor for 45 minutes. The reaction mixture was passed from the reactor, through a condenser, into a receiving chamber. Hydrogen and unchanged ammonia were separated from each other by continuous scrubbing with water during the run, and the hydrogen was collected in a gas holder. The benzonitrile, water, and unchanged toluene remained in the receiving chamber and, subsequently, the benzonitrile was separated from the water and toluene by distillation.

The pertinent data for these runs are tabulated in Tables V and VI. In Table V are given data on the runs made in accordance with the process of the patent, and in Table VI are given data on the water-in-charge runs made under similar conditions.

TABLE V

| Example | Temperature, °F. | (Runs Made in Isothermal Reactor-Anhydrous Conditions) | | | |
|---|---|---|---|---|---|
| | | Ammonia Toluene Mole Ratio | Liquid Space Velocity | Conversion Per Pass [1] | Ultimate Yield [1] |
| XVII | 960 | 1.0 | 2.4 | 4.9 | 71.8 |
| XVIII | 1000 | 1.0 | 2.5 | 6.1 | 72.1 |

[1] Lbs. benzonitrile per 100 lbs. toluene charged.

TABLE VI

| Example | Per Cent Water Charged [1] | Temperature, °F. | (Runs Made in Isothermal Reactor-Water-in-Charge) | | | |
|---|---|---|---|---|---|---|
| | | | Ammonia Toluene Mole Ratio | Liquid Space Velocity | Conversion Per Pass [2] | Ultimate Yield [2] |
| XIX | 1.0 | 960 | 1.0 | 2.5 | 4.6 | 70.8 |
| XX | 10.0 | 1000 | 1.0 | 2.3 | 5.5 | 74.3 |

[1] Based on toluene, by weight.
[2] Lbs. benzonitrile per 100 lbs. toluene charged.

Comparing the data in Tables V and VI, it will be readily apparent that no improvement is obtained by adding water to the hydrocarbon charge in an isothermal process for the production of benzonitrile.

It will be apparent from the foregoing examples that the present improved process provides an efficient, inexpensive, and safe process for obtaining benzonitrile. The process is of considerable value in making commercially available relatively inexpensive benzonitrile which is useful, for example, as an intermediate in organic synthesis.

Although the present invention has been described with preferred embodiments, it is to be understood that modifications and variations may be resorted to without departing from the spirit and scope of this invention, as those skilled in the art will readily understand. Such variations

What is claimed is:

1. In the adiabatic process for the production of benzonitrile, which comprises contacting toluene with ammonia, in the gaseous phase, in an adiabatic reaction zone, at temperatures varying between about 800° F. and about 1250° F., and in the presence of a catalyst comprising a molybdenum oxide; the improvement which includes introducing water into said adiabatic reaction zone.

2. In the adiabatic process for the production of benzonitrile, which comprises contacting toluene with ammonia, in the gaseous phase, in an adiabatic reaction zone, at temperatures varying between about 800° F. and about 1250° F., and in the presence of a catalyst comprising a molybdenum oxide; the improvement which includes introducing water into said adiabatic reaction zone in amounts varying between about one per cent and about ten per cent by weight based on the weight of the toluene.

3. In the adiabatic process for the production of benzonitrile, which comprises contacting toluene with ammonia, in the gaseous phase, in an adiabatic reaction zone, at temperatures varying between about 850° F. and about 1075° F., and in the presence of a catalyst comprising a molybdenum oxide supported on a catalyst support; the improvement which includes introducing water into said adiabatic reaction zone.

4. In the adiabatic process for the production of benzonitrile, which comprises contacting toluene with ammonia, in the gaseous phase, in an adiabatic reaction zone, at temperatures varying between about 850° F. and about 1075° F., and in the presence of a catalyst comprising a molybdenum oxide supported on a catalyst support; the improvement which includes introducting water into said adiabatic reaction zone in amounts varying between about one per cent and about ten per cent by weight based on the weight of the toluene.

5. In the adiabatic process for the production of benzonitrile, which comprises contacting toluene with ammonia, in the gaseous phase, in an adiabatic reaction zone, at temperatures varying between about 850° F. and about 1075° F., and in the presence of a catalyst comprising molybdenum trioxide, supported on alumina; the improvement which includes introducing water into said adiabatic reaction zone in amounts varying between about one per cent and about ten per cent by weight based on the weight of the toluene.

FRANK A. KLIMITAS.
HERBERT E. RASMUSSEN.

REFERENCES CITED

The following references are of record in the file of this patent:

UNITED STATES PATENTS

| Number | Name | Date |
|---|---|---|
| 2,417,893 | Teter | Mar. 25, 1947 |
| 2,450,632 | Caldwell et al. | Oct. 5, 1948 |